Dec. 25, 1951 J. A. BURTON 2,580,073

TIME MULTIPLEX TELEVISION IN COLOR

Filed May 1, 1948 4 Sheets-Sheet 1

INVENTOR
J. A. BURTON
BY
Stanley B. Kent
ATTORNEY

INVENTOR
J. A. BURTON
BY Stanley B. Kent
ATTORNEY

Dec. 25, 1951 J. A. BURTON 2,580,073

TIME MULTIPLEX TELEVISION IN COLOR

Filed May 1, 1948 4 Sheets-Sheet 3

INVENTOR
J. A. BURTON
BY
Stanley B. Kent
ATTORNEY

Dec. 25, 1951 J. A. BURTON 2,580,073

TIME MULTIPLEX TELEVISION IN COLOR

Filed May 1, 1948 4 Sheets-Sheet 4

INVENTOR
J. A. BURTON
BY Stanley B. Kent
ATTORNEY

Patented Dec. 25, 1951

2,580,073

UNITED STATES PATENT OFFICE 2,580,073

TIME MULTIPLEX TELEVISION IN COLOR

Joseph A. Burton, Chatham, N. J., assignor to Bell Telephone Laboratories, Incorporated, New York, N. Y., a corporation of New York Application May 1, 1948, Serial No. 24,613

7 Claims. (Cl. 178—5.4)

This invention relates to electro-optical color systems.

An object of the invention is to provide an improved device for producing different colors on a viewing screen.

Another object is to provide an improved television system for producing images in color.

A feature of this invention is a cathode ray tube having a multilayer luminescent screen, each layer consisting of a material which luminesces with a characteristic color when bombarded with electrons at a suitable velocity. If the tube is to be used for color television the screen might consist of three superimposed layers adapted to emit red, green and blue light, respectively. The color emitted is determined by the velocity of the electrons when they strike the screen.

Another feature of the invention is a television system comprising such a cathode ray tube with a multilayer luminescent screen and means to accelerate the electrons of the scanning cathode ray beam to produce the necessary color components to produce an image in natural color. For example, the material of the layer nearest the electron gun might be a phosphor giving red light emission, the intermediate layer a phosphor giving green light emission, and the layer farthest from the electron gun a phosphor giving blue light emission. Because of the fact that the energy loss per unit distance is much greater for slow electrons than for fast electrons, most of the light emission will be produced in the regions of the phosphor where the electrons are stopped and relatively less light is produced in the regions of the phosphor that are traversed when the electrons still have a high velocity. For a low velocity electron beam the electrons are substantially all stopped in the red light emitting layer so that only red light is produced. With a medium voltage beam the electrons pass through the phosphor giving red light emission at high velocity producing relatively little red light while most of the energy loss occurs near the end of the electron path in the phosphor giving green light so that the green light emission is much more intense than the red light emission. With a still higher voltage beam the electrons pass through the layers of phosphors giving red and green light emission at high velocity and end their paths in the layer of the phosphor giving blue light emission resulting in the emission of preponderantly blue light with relatively little red and green light. The voltage for accelerating the electron beam and so determining the velocity of the electrons may be controlled by suitable signals sent by the transmitter along with the line and field scanning synchronizing signals.

Other features of the invention will appear from the further description of the invention which follows.

The invention will now be described more in detail having reference to the accompanying drawings.

Like elements in the several figures of the drawing are identified by the same reference character.

Figure 1:
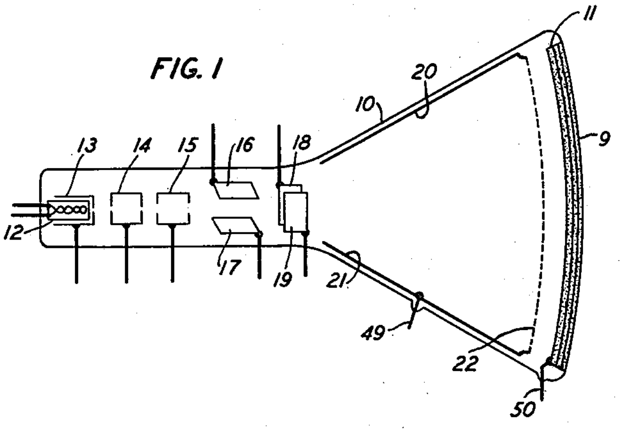
Fig. 1 illustrates diagrammatically one illustrative embodiment of the invention.

Referring now to Fig. 1, an evacuated cathode ray tube 10 is provided with a three-layer luminescent screen 11 on the enlarged viewing end wall 9. This cathode ray tube 10 is also provided with an indirectly heated electron emitting cathode 12, a control electrode or grid 13, first and second anodes 14 and 15, respectively, vertical deflecting plates 16 and 17, horizontal deflecting plates 18 and 19, and a third anode 20 consisting of a conductive coating 21 on the inside of the flared walls of the tube 10 and a fine wire mesh 22 in contact with the coating 21 and positioned parallel to but separated from the luminescent screen 11.

Figure 2:
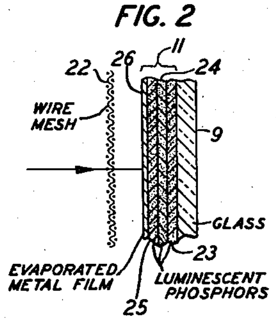
Fig. 2 is a detail of a portion of the cathode ray tube of Fig. 1 showing in cross-section the multilayer luminescent screen.

The construction of the luminescent screen 11 is illustrated in Fig. 2 which is a cross-section of a detail of the enlarged viewing end wall 9 of tube 10, luminescent screen 11 and wire mesh 22. The luminescent screen 11 consists of three layers of phosphors, each layer producing light of a different color when bombarded by electrons having suitable velocity. Layer 23 carried by the end wall 9 may consist of zinc sulphide activated with silver, ZnS:Ag, which is a blue fluorescing material. Layer 24 which overlies and is supported by layer 23 may consist of zinc sulphide activated with copper, ZnS:Cu, which is a green fluorescing material. Layer 25 which overlies and is supported by layer 24 may consist of zinc cadmium sulphide, Zn,CdS, which is prepared in such a way as to produce a red fluorescing material. A thin metallic layer 26 which can be easily penetrated by electrons overlies and is supported by layer 25. Aluminum might be used for the metallic layer 26 and applied by evaporation. The thickness of the layers in Figs. 1 and 2 is greatly exaggerated for clearness of illustration. The invention is not limited to the use of these specific luminescent materials.

It is well known that the energy lost per unit distance traveled by an electron beam in a solid increases as the electrons lose energy and is approximately inversely proportional to the energy of the electrons. With this in mind, it occurred to applicant that it might be possible to make a laminated phosphor screen which would have three phosphor layers, for example, one for red emission, one for green emission and one for blue emission. The energy of the bombarding electrons could then be controlled so that the greatest loss of energy would occur in the phosphor layer which would give the desired color. Thus the voltage of the electron beam would control the color of the light emission and the beam current would control the brightness.

This concept was embodied in the cathode ray tube 10 described hereinbefore in connection with Figs. 1 and 2. Electrons from the cathode 12 controlled as to number by the control electrode 13 are formed into a beam by anodes 14 and 15 and deflected as desired by deflecting plates 16 and 17, and 18 and 19. The wire mesh electrode 22 at the same voltage as the second anode 15 prevents disturbances of the focussing and deflecting operations. The voltage for controlling the penetration of electrons of the electron beam into the luminescent screen 11 is impressed between the metallic layer 26 and the mesh electrode 22. To produce red light this voltage is of a value such that the electrons of the beam are stopped in the red fluorescing material of layer 25. To produce green light the voltage is of a value such that the electrons of the beam pass through the red light producing layer 25 at high velocity and therefore without much loss of energy and are stopped in the green fluorescing material of layer 24 resulting in a much greater emission of green light than of red. To produce blue light the voltage is still higher and of such a value that the electrons of the beam pass through both the red light producing layer 25 and the green light producing layer 24 at high velocity without much loss of energy and are stopped in the blue fluorescing material of layer 23 resulting in a much greater emission of blue light than of red and green light.

Figure 3:
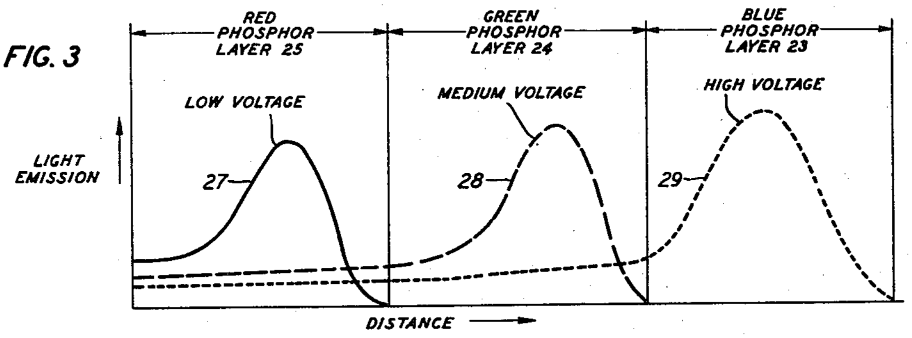
Fig. 3 shows idealized qualitative graphs illustrative of the operation of the invention.

The foregoing effect is shown qualitatively and in idealized form by the graphs of Fig. 3. The abscissas represent penetration of the electrons from the cathode ray beam into the layers of the luminescent screen 11 and the ordinates represent light emission from the layers. Graph 27 shows the emission of red light by the electrons which are stopped in the layer 25, the area under the graph representing the total light emitted. Graph 28 shows the emission of green and red light by electrons which pass through the layer 25 and are stopped in the layer 24. The emission of green light is predominant. Graph 29 shows the emission of blue, green and red light by electrons which pass through layers 25 and 24 and are stopped in layer 23. The emission of blue light is predominant. It is thus seen that by controlling the voltage impressed on metallic electrode 26 and wire mesh 22, the color of the light emitted by luminescent screen 11 may be made predominantly red, green or blue, as desired.

The cathode ray tube just described may be embodied in a color television system according to another feature of this invention. Such a system is shown schematically in Fig. 4. This system involves at the transmitter only a relatively small change from accepted present practice. A television camera tube, such as an iconoscope, image dissector, or image orthicon tube is used with red, green and blue optical filters which are moved mechanically in front of the objective lens of the system. These filters are moved in synchronism with the field scanning so that successive field scannings correspond to the desired red, green and blue color mixing components, respectively. The optical absorption characteristics of these filters is matched with the spectral response of the photoelectric pick-up device and with the spectral distribution of the light emission of the three phosphor layers 23, 24 and 25 of the cathode ray tube 10 in such a way that the camera tube and red filters will have approximately the same spectral response as the red emission from the phosphor layer 25 when the accelerating voltage of the cathode ray beam is such as to excite the red phosphor most efficiently. Similarly, the blue and green filters with the camera tube are chosen to match the emission from the blue and green phosphor layers, respectively, when the accelerating voltages of the cathode ray beam are such as to excite them predominantly. Thus, in operation, the camera tube with the system of mechanically rotated optical filters is sensitive first to red light, then to green light and then to blue light cyclically, the change from one color to the next being made between successive field scannings.

The resulting video signals with the necessary synchronizing signals are transmitted over any suitable television channel, one such channel being a radio channel, for example. The only essential new component of such signal is a synchronizing pulse for maintaining the color of the light emission at the receiver in synchronism with the color sensitivity of the camera tube. In a well-known system for black and white television the video signal is transmitted line by line with a line scanning synchronizing pulse transmitted between each line scanning. At the end of each field scanning there is also transmitted a vertical scanning synchronizing pulse with suitable equalizing pulses. For color according to an illustrative embodiment of this invention every third field scanning synchronizing pulse is characteristic of a color cycle. This system is adaptable to interlaced scanning which is now generally adopted for black and white television. With interlaced scanning according to the R. M. A. (Radio Manufacturers Association) standards there are sixty field scannings per second, each two adjacent field scannings being interlaced to form one frame scanning at the rate of thirty frame scannings per second. According to the color system of the present invention the color changes at the end of each field scanning and a color cycle requires one-twentieth of a second so that color cycles occur at the rate of 20 color cycles per second. This relationship is shown in Fig. 10 (A) where time is represented horizontally from left to right in the direction of the arrow.

Figure 10:
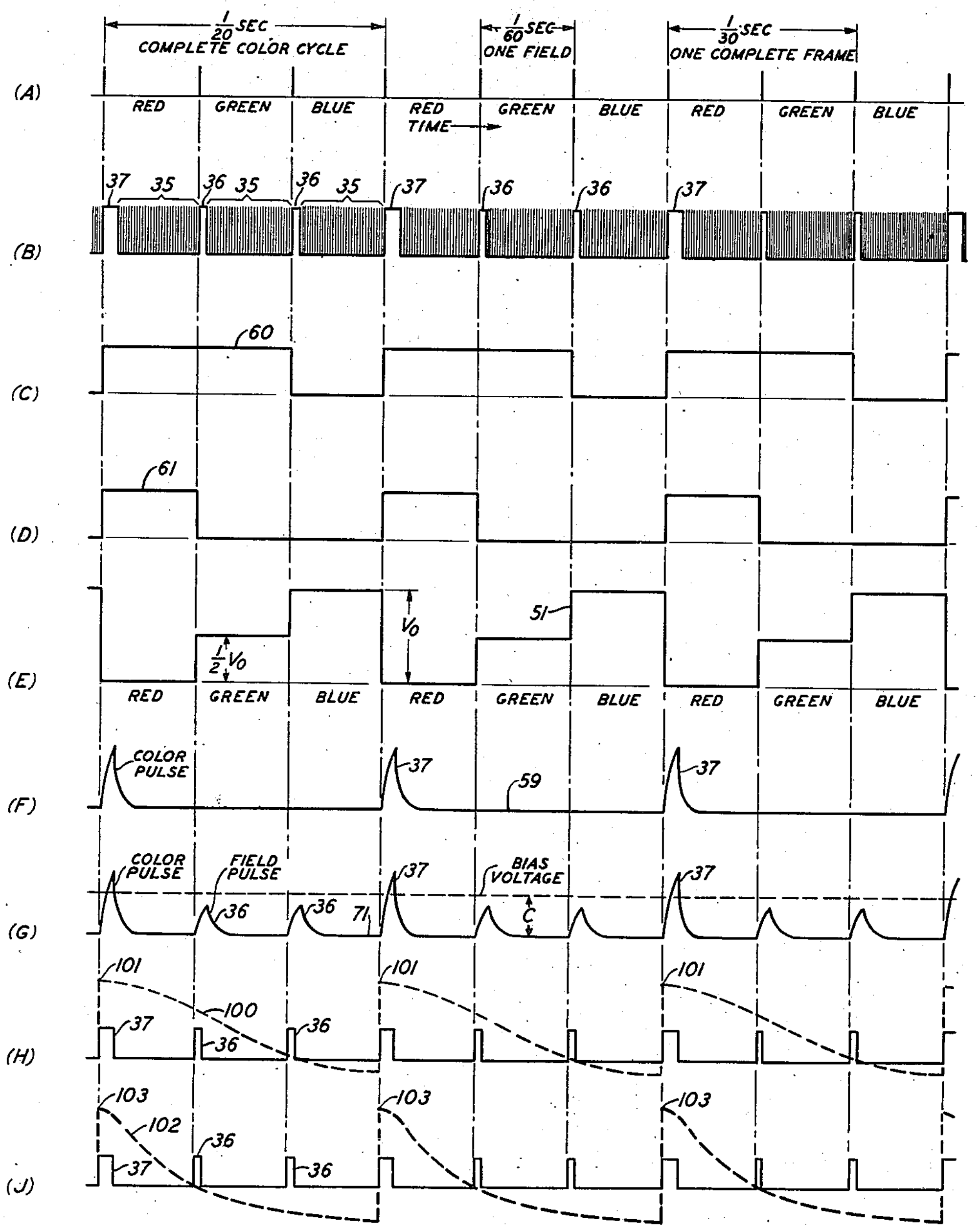
Fig. 10 shows graphs illustrative of the operation of the system illustrated in Figs. 4 to 9.

The corresponding synchronizing pulses according to an illustrative embodiment of this invention are shown in Fig. 10 (B). The line scanning synchronizing pulses 35 are represented schematically by vertical lines since in an actual system there are many more pulses per field scanning than can be shown on the time scale of Fig. 10. Furthermore, in this illustrative embodiment there are an odd number of line scanning pulses per complete frame to effect interlacing. The ordinary field scanning synchronizing pulses 36 are of considerably longer duration than the line scanning synchronizing pulses. The equalizing pulses mentioned hereinbefore are not shown. The color cycle synchronizing pulses 37 occur at the end of every third field scanning and are characterized by a duration considerably longer than that of the field synchronizing pulses 36. The color cycle synchronizing pulses 37 are also accompanied by equalizing pulses (not shown) since these pulses also function as field scanning synchronizing pulses.

The synchronizing pulse signals therefore consist of short duration horizontal line scanning synchronizing pulses 35, medium duration vertical field scanning synchronizing pulses 36, and long duration color cycle and field scanning synchronizing pulses 37. These synchronizing pulse signals would be generated at the transmitter by means of well-known types of multivibrator circuits.

Figure 4:
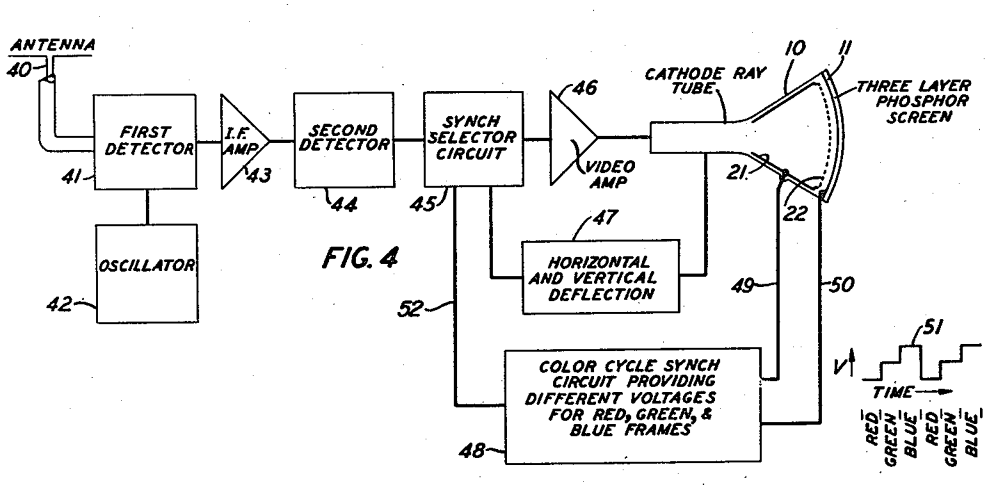
Fig. 4 is a schematic diagram of a television receiving system according to the invention.

At the receiver illustrated in Fig. 4 the transmitted video and synchronizing pulse signals would be utilized after detection of the radio signal to produce an observable image on the three-layer luminescent screen 11 of cathode ray tube 10. The transmitted radio signal is picked up by an antenna 40 and the video and synchronizing pulse signals obtained by double detection in a first detector 41 locally energized by current from intermediate frequency oscillator 42, amplified by intermediate frequency amplifier 43 and finally detected by second detector 44. The synchronizing scanning and color cycle pulses are separated from the video signals by the synchronizing selector circuit 45. The video signals are amplified in video amplifier 46 and impressed on the control electrode of cathode ray tube 10 to control the intensity of or number of electrons in the cathode ray beam which bombards the screen 11. The synchronizing scanning and color cycle pulses are impressed on the horizontal and vertical deflection circuit 47 and the color cycle synchronizing circuit 48. The elements of the horizontal and vertical deflection circuit 47 are effectively identical with circuits now in use for black and white television with interlaced scanning. The horizontal deflection is controlled by the line scanning pulses 35 and the accompanying equalizing pulses. The vertical deflection is controlled by the ordinary field scanning synchronizing pulses 36 and also by the color cycle synchronizing pulses 37 of longer duration. Thus the vertical field scannings are started each one-sixtieth of a second by either of these two types of pulses.

The color cycle synchronizing circuit 48 functions to produce an accelerating voltage which is impressed between the wire mesh 22 and the thin metallic layer 26 of cathode ray tube 10. Conductor 50 is connected to layer 26 and conductor 49 to wire mesh 22, the arrangement of circuit 48 being such that conductor 50 is positive with respect to conductor 49. The voltage impressed on conductor 50 is represented by graph 51 in Fig. 4.

The connecting circuit between the synchronizing selector circuit 45 and the color cycle synchronizing circuit 48 is represented by the line 52. This circuit may be a pair of conductors or it may consist of a single conductor and a second connection through ground.

For a more detailed description of the color cycle synchronizing circuit 48 reference will now be made to Fig. 5. The schematic circuit of Fig. 5 comprises a duration selection circuit 53, a No. 1 multivibrator 54, a No. 2 multivibrator 55 and a pair of high voltage triodes 56 and 57 controlled respectively by multivibrators 54 and 55 to supply a suitable voltage to cathode ray tube 10 through conductor 50 as shown in Fig. 4. Synchronizing pulses of the kind shown in Fig. 10 (B) carried by circuit 52 are impressed on the duration selection circuit 53. The field scanning synchronizing pulses 36 and the color cycle synchronizing pulses 37 only are shown in graph 58. From the pulses of graph 58 the selection circuit 53 selects only the color cycle synchronizing pulses 88 shown by graph 59. The pulses 88 are impressed simultaneously on multivibrators 54 and 55. Multivibrator 54 is so constructed that after being triggered by a pulse 88 it remains active for the period of two field scannings and inactive for one fiield scanning as shown by graph 60. Multivibrator 55 is triggered at the same time by pulse 88 but it remains active for the duration of one field scanning and inactive for two field scannings as shown by graph 61. The relation of these graphs 60 and 61 to the field scannings is shown by the similarly numbered graphs in Fig. 10 (C) and (D).

The output voltages of multivibrators 54 and 55 control respectively the conductivity of triodes 56 and 57. The high voltage power supply +V is common to both high voltage triodes 56 and 57. The anode of triode 56 is connected to the power supply +V through resistors 62 and 63 in series while the anode of triode 57 is connected to the power supply +V only through resistor 63. Triodes 56 and 57 are biased respectively by biasing sources represented by batteries 64 and 65 so that when their grids are at zero potential, that is, ground potential no current passes in them and the output voltage will then be the voltage of source +V less the voltage drop in resistor 63 due to current flowing in the cathode ray tube. The resistance of resistor 63 would be made sufficiently small so as to keep such voltage drop small. When the No. 1 vibrator 54 is active and therefore its output voltage is positive making the grid of triode 56 positive, triode 56 passes current and the voltage of conductor 50 falls to a value lower than that of source +V. For example, if the resistance values of resistors 62 and 63 are equal and if the voltage drop in the triode 56 is much less than the voltage of the source +V when the grid of triode 56 is positive, then the voltage of the output conductor 50 will be very nearly one-half that of the source +V. When the No. 2 multivibrator 55 is active and therefore its output voltage is positive making the grid of triode 57 positive, triode 57 passes current so that the voltage thereacross is very low, say only a few hundred volts compared with the voltage of the source +V which might be 20,000 volts. The voltage of conductor 50 therefore is +20,000 volts when neither of multivibrators 54 and 55 is active, +10,000 volts when multivibrator 54 alone is active and approximately zero volts when multivibrator 55 is active.

These voltage conditions in relationship to the field scannings is shown by graph 51 in Fig. 10 (E) where $V_0$ represents the voltage of the high voltage power source +V. Under these conditions it is seen that the electrons of the cathode ray beam in cathode ray tube 10 are accelerated very little in their travel from wire mesh 22 to metallic layer 26 during each red field scanning but are accelerated by a voltage ½ $V_0$ during each green field scanning and by voltage $V_0$ during each blue field scanning. These voltages added to the normal accelerating voltage of the cathode ray tube cause a penetration of the three-layer luminescent screen 11 of cathode ray tube 10 to produce light emission of the necessary colors to produce television images in color.

Figure 6:
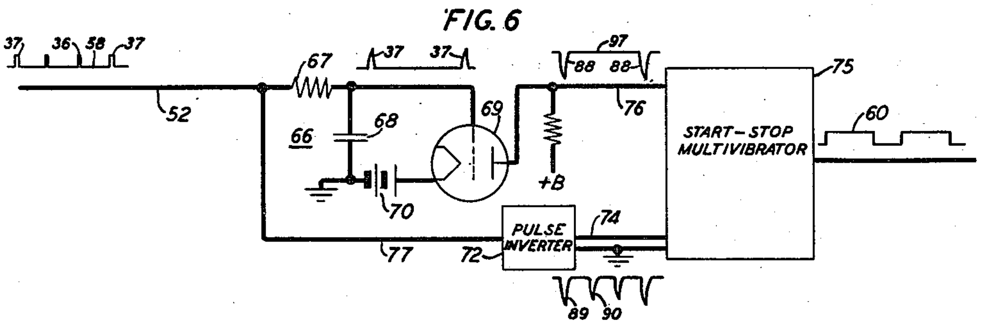

An example of a duration selection circuit 53 is shown in Fig. 6. The long duration color cycle pulses 37 are distinguished from the shorter duration field scanning pulses 36 by an integrating circuit 66 comprising a resistor 67 and a condenser 68. The voltage across condenser 68 is impressed on the grid of triode 69. The cathode of triode 69 is normally biased well beyond cut-off by a source of biasing voltage represented by battery 70. The integrated voltage as it appears across condenser 68 is represented by graph 71 of Fig. 10 (G). The shorter duration field scanning synchronizing pulses 36 when integrated appear as pulses 36 in graph 71 of less amplitude than the integrated color cycle pulses 37. Because of the negative bias on triode 69 from battery 70 represented by the distance C in Fig. 10 (G) the smaller amplitude pulses 36 do not appear in the output circuit of triode 69 and only pulses corresponding to the larger amplitude color cycle pulses 37 appear as shown in Fig. 10 (F).

In the circuit of Fig. 6 a start-stop multivibrator 75 is shown connected to the pulse inverter triode 69 by conductor 76 and also to conductor 52 by conductor 74 through pulse inverter 72 by conductor 77. This type of multivibrator is positive in action and readily controlled by the synchronizing pulses in the embodiment of applicant's invention selected for illustrative purposes. Conductor 76 is connected to the starting element and conductor 74 to the stopping element of multivibrator 75. Multivibrator 75 as illustrated in Fig. 6 is so adjusted as to produce an output voltage the same as the output voltage of No. 1 multivibrator 54 of Fig. 5. This voltage is represented by graph 60.

Figure 7:
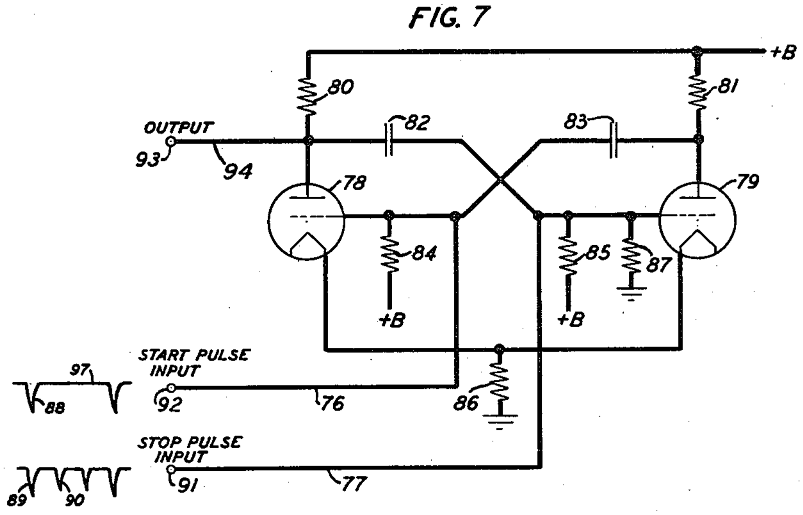

Details of the circuit of multivibrator 75 are shown in Fig. 7. This multivibrator comprises two triodes 78 and 79, anode resistors 80 and 81, switching condensers 82 and 83, grid biasing resistors 84 and 85, cathode resistor 86 and grid resistor 87. The adjustment of this circuit is such that normally triode 78 is conducting and triode 79 is blocked because almost the whole positive voltage of source +B is impressed on the grid of triode 78 through resistor 84. The plate current of triode 78 flowing through the common resistor 86 results in a large effective negative bias being applied to triode 79 in opposition to the positive bias applied by resistor 87 which continues to maintain triode 79 in a cut-off condition. When a negative pulse 88 of relatively short duration is impressed upon the grid of triode 78 this tube will be driven towards cut-off with an attendant increase in the plate potential thereof. This increase in positive voltage will be impressed upon the grid of triode 79 through condenser 82 causing triode 79 to conduct plate current. The resulting decrease in voltage at the plate of triode 79 further decreases the grid potential of triode 78 through the coupling condenser 83. This action progresses almost instantaneously until triode 78 is driven beyond plate current cut-off and triode 79 is conducting. This condition continues as long as the charge of condenser 83 maintains the grid of triode 78 at a negative potential. When the condenser 83 has discharged through resistor 84 sufficiently to allow the grid of triode 78 to increase above the cut-off value, triode 78 will again conduct current and the resultant action will reduce and eventually cut off the plate current of triode 79. This change-over action is relatively very rapid. The duration of the cycle of operation is dependent upon the time constant of the circuit including resistor 84 and condenser 83 and may be controlled as desired by proper selection of these elements. Triode 78 may also be returned to the conducting condition by a negative pulse 89 or 90 applied to the grid of triode 79 through conductor 77 from the stop pulse input terminal 91. The stop pulse would have to be very large if applied immediately after the application of the start pulse 88 to start pulse input terminal 92 in order to restore triode 78 to the conducting condition but stop pulses of lesser and lesser amplitudes would effect the results as time goes on. A relatively small stop pulse would be effective just before condenser 83 becomes discharged through resistor 84. The output voltage of the start-stop multivibrator of Fig. 7 is the voltage of the anode of triode 78 as it appears at output terminal 93 which is connected to the plate by conductor 94.

Figure 8:
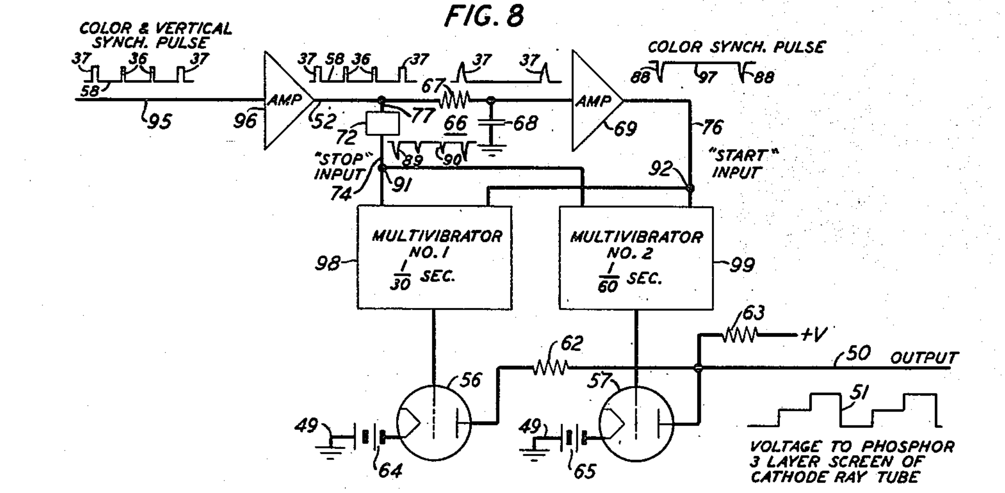

The use of pulse control circuits of the kind illustrated in Fig. 6 with start-stop multivibrators of the kind illustrated in Fig. 7 in an illustrative embodiment of applicant's invention is shown in Fig. 8. The color cycle and synchronizing pulses after selection in synchronizing selector circuit 45 of Fig. 4 are impressed on amplifier 96 by conductor 95 and appear in conductor 52. In the integrating circuit 66 the color cycle pulses 37 are accentuated in amplitude relatively to the shorter duration field scanning pulses 36 and in biased pulse inverter 69 selected and inverted where they appear as negative pulses 88 in graph 97. Pulses 88 are impressed simultaneously by conductor 76 on the start pulse input terminals 92 of two start-stop multivibrators 98 and 99 each of the kind shown in Fig. 7. The color cycle and synchronizing pulses in the output circuit of amplifier 96 are impressed on pulse inverter 72 by conductors 52 and 77. They appear as negative pulses 89 and 90 in the output circuit of pulse inverter 72 and are impressed simultaneously on the stop pulse input terminals 91 of start-stop multivibrators 98 and 99.

The adjustment and operation of multivibrators 98 and 99 will now be described. As mentioned hereinbefore these multivibrators are each of the kind described with reference to Fig. 7. Multivibrator 98 which corresponds to the No. 1 multivibrator of Fig. 5 is adjusted so that the time constant of resistor 84 and condenser 83 will make triode 78 conducting again in the absence of a stop pulse in slightly more than one-thirtieth of a second after it has been made non-conducting by a start pulse. A relatively small stop pulse 90 occurring one-thirtieth second after a start pulse 88, will stop the multivibrator and make triode 78 conducting one-thirtieth second after it was blocked by start pulse 88. A similar stop pulse 90 occurring one-sixtieth second after a start pulse 88 will not be effective to make triode 78 conducting. This relationship is illustrated by Fig. 10 (H). Dotted line graph 100 shows the minimum amplitude of a stop pulse necessary to make triode 78 again conducting after it has been blocked by a start pulse corresponding to a color cycle synchronizing pulse 37 indicated by points 101 on graph 100. The stop pulse 90 corresponding to the first leld synchronizing pulse 36 occurring one-sixtieth second after the start pulse 37 is not large enough to make triode 78 conducting but the stop pulse 90 corresponding to the second field synchronizing pulse 36 occurring one-thirtieth second after the start pulse 37 is large enough and does make triode 78 conducting. Therefore, the output voltage of the No. 1 multivibrator 98 is of the form shown by graph 60 in Fig. 10 (C). The amplitudes of the start pulses 88 are such that multivibrators 98 and 99 are started thereby in spite of the fact that stop pulses 89 are impressed simultaneously on stop pulse input terminals 91.

Figure 5:
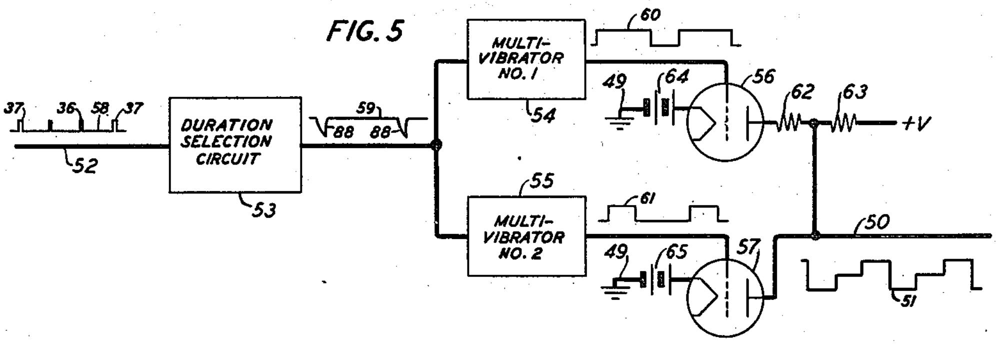
Figs. 5 to 9 illustrate circuit details of the system of Fig. 4.

Multivibrator 99 which corresponds to No. 2 multivibrator of Fig. 5 is similar to multivibrator 98 but it is so adjusted that a first stop pulse 90 occurring after a start pulse 88 will cause triode 78 to again become conducting. The time constant of the circuit including resistor 84 and condenser 83 of multivibrator 99 is adjusted so as to make triode 78 conducting again in the absence of a stop pulse in slightly more than one-sixtieth second after it has been made non-conducting by a start pulse. This relationship is illustrated by Fig. 10 (J). Dotted line graph 102 shows the minimum amplitude of a stop pulse necessary to make triode 78 again conducting after it has been blocked by color cycle synchronizing pulse 37 indicated by the points 103 on graph 102. The stop pulse 90 corresponding to the first field synchronizing pulse 36 occurring one-sixtieth second after the start pulse 37 will make triode 78 conducting. The second field synchronizing pulse 36 occurring one-thirtieth second after the start pulse 37 will have no effect because triode 78 of multivibrator 99 has been rendered conducting already. Therefore the output voltage of the No. 2 multivibrator 99 is of the form shown by graph 61 of Fig. 10 (D).

The output voltages of multivibrators 98 and 99 are used to control triodes 56 and 57 and their interconnections in the manner described in connection with Fig. 5 to produce a color controlling voltage of the form shown in Fig. 10 (E). This voltage is used in the production of a television image in color as described hereinbefore with reference to Fig. 4.

Figure 9:
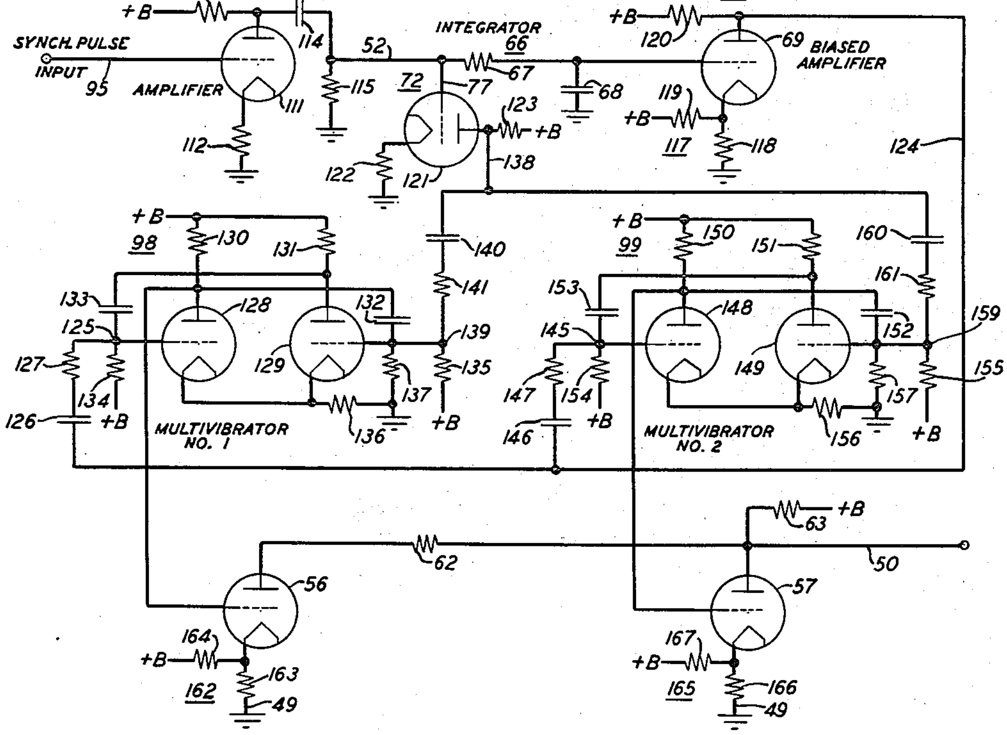

An illustrative circuit which might be used for the color cycle synchronizing circuit 48 of Fig. 4 is shown in detail in Fig. 9. The synchronizing signals including the line scanning synchronizing pulses 35, the ordinary field scanning synchronizing pulses 36 and the color cycle synchronizing pulses 37 as shown in Fig. 10 (B) are selected by the synchronizing selector circuit 45 and amplified by synchronizing pulse amplifier 110 forming a part of the synchronizing selector circuit 45. This amplifier 110 comprises a triode 111, a cathode-resistor 112, a coupling resistor 113, a coupling condenser 114 and a load resistor 115. The integrating circuit 66 is the same as that described with reference to Fig. 6 which comprises a series resistor 67 and a shunt condenser 68. The voltage across condenser 68 is impressed on the input circuit of biased amplifier 116 comprising the triode 69, cathode biasing voltage divider 117 consisting of cathode resistor 118, and resistor 119, and a coupling resistor 120. Pulse inverter 72 consists of a triode 121, a cathode resistor 122 and a coupling resistor 123. The grid of triode 121 has impressed thereon by conductor 77 the synchronizing pulses carried by conductor 52. The starting pulses 88 corresponding to the color cycle synchronizing pulses 37 are impressed by conductor 124 on the start terminal 125 of the No. 1 multivibrator 98 through coupling condenser 126 and series resistor 127. Multivibrator 98 comprises two triodes 128 and 129, anode resistors 130 and 131, switching condensers 132 and 133, grid biasing resistors 134 and 135, cathode resistor 136 and grid resistor 137. The resistance of resistor 134 and capacity of condenser 133 is so chosen that the normal period of the blocking of triode 128 after each starting pulse is slightly longer than one-thirtieth second as illustrated by Fig. 10 (H). The stop pulses 90 corresponding to the field scanning synchronizing pulses 36 are impressed by conductor 138 on the stop pulse terminal 139 through coupling condenser 140 and series resistor 141. The starting pulses 88 carried by conductor 124 are impressed simultaneously on the start terminal 145 of No. 2 multivibrator 99 through coupling condenser 146 and series resistor 147. Multivibrator 99 comprises two triodes 148 and 149, anode resistors 150 and 151, switching condensers 152 and 153, grid biasing resistors 154 and 155, cathode resistor 156 and grid resistor 157. The resistance of resistor 154 and the capacity of condenser 153 are so chosen that the normal period of the blocking of triode 148 after each starting pulse is slightly longer than one-sixtieth second as illustrated by Fig. 10 (J). The stop pulses 90 corresponding to the field scanning synchronizing pulses 36 carried by conductor 138 are simultaneously impressed on the stop pulse terminal 159 through coupling condenser 160 and series resistor 161. The anode potentials for the triodes are furnished by direct current source +B. Cathode biasing voltages for triodes 69, 128, 129, 148 and 149 are obtained from the same source. The output voltages from multivibrators 98 and 99 are combined in the circuit comprising triodes 56 and 57 and resistors 62 and 63 as described in connection with Figs. 5 and 8. The cathode biasing voltage for triode 56 is obtained from voltage divider 162 consisting of resistors 163 and 164 connected in series across source +B. The cathode biasing voltage for triode 57 is obtained from voltage divider 165 consisting of resistors 166 and 167 connected in series across the source +B.

In a modification of the circuit of Figs. 8 and 9 the pulse inverter 72 is omitted. The conductor 74 in Fig. 8 is connected to conductor 95. Amplifier 96 is then constructed to function as a pulse inverter. In Fig. 9 conductor 138 is connected to conductor 95. In both of these modifications the pulses impressed on amplifiers 96 and 110 are of negative polarity.

In place of the triodes of Fig. 9 and others of the figures, other suitable tubes may be used such as pentodes. Embodiments of the invention other than those described as illustrative hereinbefore will occur to persons skilled in this art. Such modifications come within the purview of the appended claims.

What is claimed is:

1. A system for producing television images in color, comprising an image-producing device having voltage control means for determining the color of the produced image, a source of video signals producing cyclically video signals corresponding to the primary colors used to produce the images in color, a source of color cycle synchronizing signals producing one current pulse only for each group of colors in a color cycle, means to impress video signals from said source on said image-producing device in color cycles of the primary colors, and means triggered by the current pulses of the color cycle synchronizing signals from said source to produce and impress color control voltages on said voltage control means to determine the color of the produced image.

2. A system for producing television images in color. comprising a cathode ray tube having a luminescent screen adapted to produce light of different primary colors dependent upon the velocity of the bombarding electrons, means controlled by line and field scanning pulses to effect field scannings of said screen in succession, and means controlled by characteristic color cycle synchronizing scanning pulses consisting of one current pulse for each group of colors in a color cycle to control the velocity of the luminescent screen bombarding electrons to produce a color sequence of the primary colors.

3. A receiver for producing television images in color comprising a conductor of composite signals including video signals representative of the intensity characteristics of successive field scannings of a field of view an image of which is to be produced in color, the scannings of groups of successive field scannings corresponding respectively to the color components representative of the primary colors used in producing the images in color, line scanning synchronizing pulses, field scanning synchronizing pulses, and color cycle synchronizing pulses, a synchronizing selector circuit which separates the video signals from the synchronizing signals, a cathode ray tube including a source of electrons, a beam intensity control electrode, electron beam forming electrodes, horizontal deflecting plates, vertical deflecting plates, a multilayer luminescent viewing screen adapted to produce light of the primary colors used in producing images in color dependent upon the velocity of the electrons in the beam as they strike the screen, and a multiple-apertured electron velocity controlling electrode parallel and close to said multilayer screen, means to impress video signals from said synchronizing selector circuit on said beam intensity control electrode. means including said electron beam forming electrodes forming the electrons from said source of electrons into a beam, means utilizing said line scanning synchronizing pulses, said field scanning synchronizing pulses, and said color cycle synchronizing pulses to produce line scanning voltages and field scanning voltages and impressing said voltages on said horizontal deflecting plates and said vertical deflecting plates respectively, and a color cycle synchronizing means utilizing said color synchronizing pulses to produce velocity controlling voltages and impressing said voltages on said electron velocity controlling electrodes to determine the primary color produced during the successive field scannings of said viewing screen.

4. A receiver for producing television images in color according to claim 3 in which the color cycle synchronizing means comprises a duration selection circuit including a series resistor, a shunt condenser and a biased triode having line scanning synchronizing pulses, field scanning synchronizing pulses and color cycle synchronizing pulses impressed thereon and producing only color cycle synchronizing pulses of opposite polarity than the impressed color cycle synchronizing pulses, a first multivibrator controlled by said color cycle synchronizing pulses of opposite polarity and producing substantially square-topped pulses of the duration of two successive field scannings, a second multivibrator also controlled by said color cycle synchronizing pulses of opposite polarity and producing substantially square-topped pulses of the duration of one field scanning, a first and a second triode each negatively biased to cut-off, a source of plate current for said triodes connected through a resistor to said first triode and directly to said second triode, means to impress the square-topped pulses from said first multivibrator on the input circuit of said first triode to cause plate current to flow in said first triode, means to impress the square-topped pulses from said second multi-vibrator on the input circuit of said second triode to cause plate current to flow in said second triode, and means to impress the plate voltage of said second triode on said electron velocity controlling electrode of said cathode ray tube.

5. A receiver for producing television images in color according to claim 3 in which the color cycle synchronizing means comprises a duration selection circuit including a series resistor, a shunt condenser and a biased triode having line scanning synchronizing pulses, field scanning synchronizing pulses and color cycle synchronizing pulses impressed thereon and producing only color cycle synchronizing pulses of negative polarity, a first multivibrator having a start terminal, a stop terminal and an output terminal which is positive during the interval between the application of a start pulse and a stop pulse, a second multivibrator having a start terminal, a stop terminal and an output terminal which is positive during the interval between the application of a start pulse and a stop pulse, means to impress said color cycle synchronizing pulses of negative polarity on the start terminals of both said multivibrators, means to impress both field scanning synchronizing pulses and color cycle synchronizing pulses of lesser amplitude on the stop terminals of both said multivibrators, said first multivibrator being so adjusted that the color cycle synchronizing pulses impressed on the start terminal will be effective to produce a positive voltage pulse at the output terminal which is terminated by the second field scanning synchronizing pulse occurring after each start pulse and said second multivibrator being so adjusted that the color cycle synchronizing pulses impressed on the start terminal will be effective to produce a positive voltage pulse at the output terminal which is terminated by the first field scanning synchronizing pulse occurring after each start pulse, a first and a second triode each negatively biased to cut-off, a source of plate current for said triodes connected through a first and a second resistor in series to said first triode and through said second resistor only to said second triode, means to impress the square-topped pulses from said first multivibrator on the input circuit of said first triode to cause plate current to flow in said first triode, means to impress the square-topped pulses from said second multivibrator on the input circuit of said second triode to cause plate current to flow in said second triode, and means to impress the plate voltage of said second triode on said electron velocity controlling electrode of said cathode ray tube to determine the primary color produced during the successive field scannings of said viewing screen.

6. A receiver for producing television images in color comprising a conductor of composite signals including video signals representative of the intensity characteristics of successive field scannings of a field of view an image of which is to be produced in color, the scannings of groups of successive field scannings corresponding respectively to the color components representative of the primary colors used in producing the images in color, line scanning synchronizing pulses, field scanning synchronizing pulses, and color cycle synchronizing pulses, a synchronizing selector circuit which separates the video signals from the synchronizing signals, a cathode ray tube including a source of electrons, a beam intensity control electrode, electron beam forming electrodes, horizontal deflecting plates, vertical deflecting plates, a multilayer luminescent viewing screen adapted to produce light of the primary colors used in producing images in color dependent upon the velocity of the electrons in the beam as they strike the screen, and an electron velocity controlling electrode parallel and close to said multilayer screen, means to impress video signals from said synchronizing selector circuit on said beam intensity control electrode, means including said electron beam forming electrodes forming the electrons from said source of electrons into a beam, means utilizing said line scanning synchronizing pulses, said field scanning synchronizing pulses, and said color cycle synchronizing pulses to produce line scanning voltages and field scanning voltages and impressing said voltages on said horizontal deflecting plates and said vertical deflecting plates respectively, and a color cycle synchronizing means utilizing said color synchronizing pulses to produce velocity controlling voltages and impressing said voltages on said electron velocity controlling electrode to determine the primary color produced during the successive field scannings of said viewing screen, said color cycle synchronizing means comprising a duration selection circuit including a series resistor, a shunt condenser and a biased triode having line scanning synchronizing pulses, field scanning synchronizing pulses and color cycle synchronizing pulses impressed thereon and producing only color cycle synchronizing pulses of opposite polarity than the impressed color cycle synchronizing pulses, a first multivibrator controlled by said color cycle synchronizing pulses of opposite polarity and producing substantially square-topped pulses of the duration of two successive field scannings, a second multivibrator also controlled by said color cycle synchronizing pulses of opposite polarity and producing substantially square-topped pulses of the duration of one field scanning, a first and a second triode each negatively biased to cut-off, a source of plate current for said triodes connected through a resistor to said first triode and directly to said second triode, means to impress the square-topped pulses from said first multivibrator on the input circuit of said first triode to cause plate current to flow in said first triode, means to impress the square-topped pulses from said second multivibrator on the input circuit of said second triode to cause plate current to flow in said second triode, and means to impress the plate voltage of said second triode on said electron velocity controlling electrode of said cathode ray tube.

7. A receiver for producing television images in color comprising a conductor of composite signals including video signals representative of the intensity characteristics of successive field scannings of a field of view an image of which is to be produced in color, the scannings of groups of successive field scannings corresponding respectively to the color components representative of the primary colors used in producing the images in color, line scanning synchronizing pulses, field scanning synchronizing pulses, and color cycle synchronizing pulses, a synchronizing selector circuit which separates the video signals from the synchronizing signals, a cathode ray tube including a source of electrons, a beam intensity control electrode, electron beam forming electrodes, horizontal deflecting plates, vertical deflecting plates, a multilayer luminescent viewing screen adapted to produce light of the primary colors used in producing images in color dependent upon the velocity of the electrons in the beam as they strike the screen, and an electron velocity controlling electrode parallel and close to said multilayer screen, means to impress video signals from said synchronizing selector circuit on said beam intensity control electrode, means including said electron beam forming electrodes forming the electrons from said source of electrons into a beam, means utilizing said line scanning synchronizing pulses, said field scanning synchronizing pulses, and said color cycle synchronizing pulses to produce line scanning voltages and field scanning voltages and impressing said voltages on said horizontal deflecting plates and said vertical deflecting plates respectively, and a color cycle synchronizing means utilizing said color synchronizing pulses to produce velocity controlling voltages and impressing said voltages on said electron velocity controlling electrode to determine the primary color produced during the successive field scannings of said viewing screen, said color cycle synchronizing means comprising a duration selection circuit including a series resistor, a shunt condenser and a biased triode having line scanning synchronizing pulses, field scanning synchronizing pulses and color cycle synchronizing pulses impressed thereon and producing only color cycle synchronizing pulses of negative polarity, a first multivibrator having a start terminal, a stop terminal and an output terminal which is positive during the interval between the application of a start pulse and a stop pulse, a second multivibrator having a start terminal, a stop terminal and an output terminal which is positive during the interval between the application of a start pulse and a stop pulse, means to impress said color cycle synchronizing pulses of negative polarity on the start terminals of both said multivibrators, means to impress both field scanning synchronizing pulses and color cycle synchronizing pulses of lesser amplitude on the stop terminals of both said multivibrators, said first multivibrator being so adjusted that the color cycle synchronizing pulses impressed on the start terminal will be effective to produce a positive voltage pulse at the output terminal which is terminated by the second field scanning synchronizing pulse occurring after each start pulse and said second multivibrator being so adjusted that the color cycle synchronizing pulses impressed on the start terminal will be effective to produce a positive voltage pulse at the output terminal which is terminated by the first field scanning synchronizing pulse occurring after each start pulse, a first and a second triode each negatively biased to cut-off, a source of plate current for said triodes connected through a first and a second resistor in series to said first triode and through said second resistor only to said second triode, means to impress the square-topped pulses from said first multivibrator on the input circuit of said first triode to cause plate current to flow in said first triode, means to impress the square-topped pulses from said second multivibrator on the input circuit of said second triode to cause plate current to flow in said second triode, and means to impress the plate voltage of said second triode on said electron velocity controlling electrode of said cathode ray tube to determine the primary color produced during the successive field scannings of said viewing screen.

JOSEPH A. BURTON.

REFERENCES CITED

The following references are of record in the file of this patent:

UNITED STATES PATENTS

| Number | Name | Date |
|---|---|---|
| 2,096,986 | Von Ardenne | Oct. 26, 1937 |
| 2,309,506 | Herbst | Jan. 26, 1943 |
| 2,343,825 | Wilson | Mar. 7, 1944 |
| 2,378,746 | Beers | June 19, 1945 |
| 2,431,088 | Szegho | Nov. 11, 1947 |
| 2,440,301 | Sharpe | Apr. 27, 1948 |
| 2,446,248 | Shrader | Aug. 3, 1948 |
| 2,446,764 | Henderson | Aug. 10, 1948 |
| 2,452,522 | Leverenz | Oct. 26, 1948 |
| 2,455,710 | Szegho | Dec. 7, 1948 |